United States Patent
Best et al.

(10) Patent No.: US 9,743,263 B1
(45) Date of Patent: Aug. 22, 2017

(54) METHODS, SYSTEMS, AND PRODUCTS FOR SECURITY SERVICES

(71) Applicant: AT&T Intellectual Property I, L.P., Atlanta, GA (US)

(72) Inventors: Robert Best, Dallas, TX (US); Ted Fick, Danville, CA (US); Hendrik Hofman, Danville, CA (US); Timothy Plattner, Danville, CA (US); Balaji Puli, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/043,515

(22) Filed: Feb. 13, 2016

(51) Int. Cl.
| | |
|---|---|
| *H04M 11/04* | (2006.01) |
| *H04W 4/22* | (2009.01) |
| *G08B 21/10* | (2006.01) |
| *H04W 4/14* | (2009.01) |
| *H04W 4/02* | (2009.01) |

(52) U.S. Cl.
CPC ............. *H04W 4/22* (2013.01); *G08B 21/10* (2013.01); *H04W 4/023* (2013.01); *H04W 4/14* (2013.01)

(58) Field of Classification Search
CPC ......... H04W 4/22; H04W 4/023; H04W 4/14; H04W 4/021; H04W 12/10; G08B 21/10; G08B 25/009; G08B 27/001; G08B 27/006; G05B 23/0281; G06F 17/18; H04L 67/1097; H04L 69/40; H04L 67/1095; H04L 67/22; H04L 67/125; H04L 67/12; H04L 29/08; H04L 67/02

USPC ......... 455/404.1, 550.1, 552.1, 78; 348/373; 700/94

See application file for complete search history.

(56) References Cited

U.S. PATENT DOCUMENTS

| | | | |
|---|---|---|---|
| 6,169,476 B1 * | 1/2001 | Flanagan | G08B 21/10 340/286.02 |
| 6,594,345 B1 * | 7/2003 | Vinson | H04Q 3/0029 379/207.15 |
| 6,728,340 B2 * | 4/2004 | Vinson | H04Q 3/0079 379/207.15 |
| 6,747,557 B1 | 6/2004 | Petite et al. | |
| 6,784,798 B2 | 8/2004 | Morris | |
| 6,930,596 B2 * | 8/2005 | Kulesz | G08B 21/12 340/506 |
| 7,218,217 B2 | 5/2007 | Adonailo et al. | |
| 8,412,386 B2 | 4/2013 | Fickey | |

(Continued)

FOREIGN PATENT DOCUMENTS

CN  103198607  10/2013

*Primary Examiner* — Mahendra Patel
(74) *Attorney, Agent, or Firm* — Scott P. Zimmerman, PLLC

(57) ABSTRACT

Security systems are warned of earthquakes, tornadoes, and other natural disasters. When an early warning system detects a natural disaster, the early warning system alerts a central server. The early warning system alerts the central server to the natural event and its associated geographic area. The central server may then consult a database and determine the security systems operating in a vicinity of the geographic area experiencing the natural event. The central server may thus warn the security systems of the natural event. The security systems may then implement pre-programmed procedures to protect life and property during earthquakes, tornadoes, and other natural disasters.

18 Claims, 22 Drawing Sheets

(56) References Cited

U.S. PATENT DOCUMENTS

| | | | |
|---|---|---|---|
| 2004/0183687 A1 | 9/2004 | Petite et al. | |
| 2006/0022816 A1* | 2/2006 | Yukawa | G08B 25/006 340/521 |
| 2008/0238696 A1* | 10/2008 | Amorini | G08B 27/00 340/601 |
| 2008/0258880 A1* | 10/2008 | Smith | G08B 21/10 340/286.02 |
| 2012/0179421 A1* | 7/2012 | Dasgupta | G05B 23/0281 702/181 |
| 2014/0047034 A1* | 2/2014 | Holtmanns | H04W 4/021 709/204 |
| 2014/0266762 A1* | 9/2014 | Warren | G08B 27/00 340/690 |
| 2015/0325096 A1 | 11/2015 | Hatch | |
| 2016/0093191 A1* | 3/2016 | Bloom | G08B 27/005 340/540 |

\* cited by examiner

METHODS, SYSTEMS, AND PRODUCTS FOR SECURITY SERVICES

BACKGROUND

Security systems are common in homes and businesses. Security systems alert occupants to intrusions. Security systems, though, may also warn of fire, water, and harmful gases.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
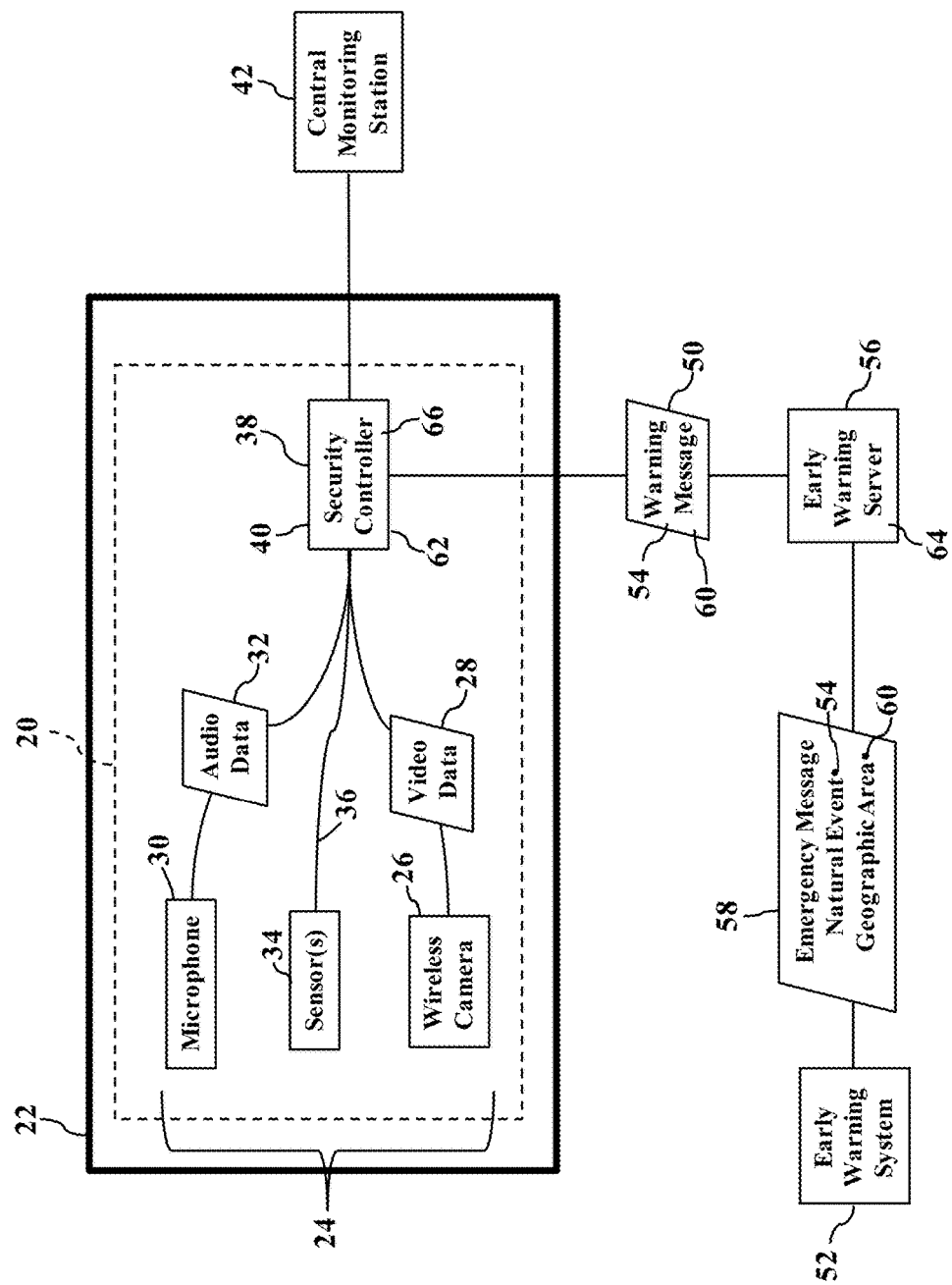
FIGS. 1-7 are simplified illustrations of an operating environment, according to exemplary embodiments.

FIGS. 1-7 are simplified illustrations of an operating environment, according to exemplary embodiments. While exemplary embodiments may be implemented in many environments, FIG. 1 illustrates a common operating environment that most readers will understand. A security system 20 is installed in a building 22, such as a home or business. The security system 20 may have many sensors 24 that protect occupants from fire, intrusion, and other security conditions. For example, a wireless camera 26 captures video data 28 of an entry door or other location in the building 22. A microphone 30 may generate audio data 32. Other sensors 34 (such as motion detectors, carbon monoxide and fire sensors, water sensors, and any other sensory devices) may also monitor areas of the building 22 and generate sensory data 36. If any sensor 24 measures or determines an abnormal or elevated sensory reading, the sensor 24 notifies a security controller 38. The security controller 38 evaluates various logical rules and confirms an alarm condition 40 indicating a fire, intrusion, or other security event. The security controller 38 then notifies a central monitoring station 42, as is known. Emergency personnel may then be summoned.

Here, though, exemplary embodiments also warn of environmental threats. Conventional security systems provide no warning of, nor protection from, natural disasters. Life and property loss are too commonly caused by earthquakes, tornadoes, hurricanes, fires, and other acts of God. Here, then, the security controller 38 may also receive an electronic warning message 50 indicating some environmental or natural disaster has been detected. The warning message 50 is triggered by any public and/or private early warning system 52. When the early warning system 52 detects, or warns of, any natural event 54 (such an earthquake, tornado, hurricane, or fire), the early warning system 52 informs an early warning server 56 of the natural event 54. FIG. 1, for example, illustrates the early warning system 52 sending an emergency message 58 to the early warning server 56. The emergency message 58 describes a geographical area 60 associated with the natural event 54. When the early warning server 56 receives the emergency message 58, the early warning server 56 maps the geographical area 60 associated with the natural event 54 to any security controllers (such as the security controller 38) having a generally matching geographic location 62. The early warning server 56 thus determines a population 64 of security controllers in a proximity of the geographical area 60 experiencing the natural event 54. The early warning server 56 may thus send the warning message 50 to the population 64 of security controllers operating in the vicinity of, or that may be affected by, the natural event 54. When the security controller 38 receives the warning message 50, the security controller 38 is thus notified of the environmental or natural disaster. The security controller 38 may thus execute pre-programmed emergency procedures 66 to protect life and property before, during, and after the natural event 54.

Figure 2:
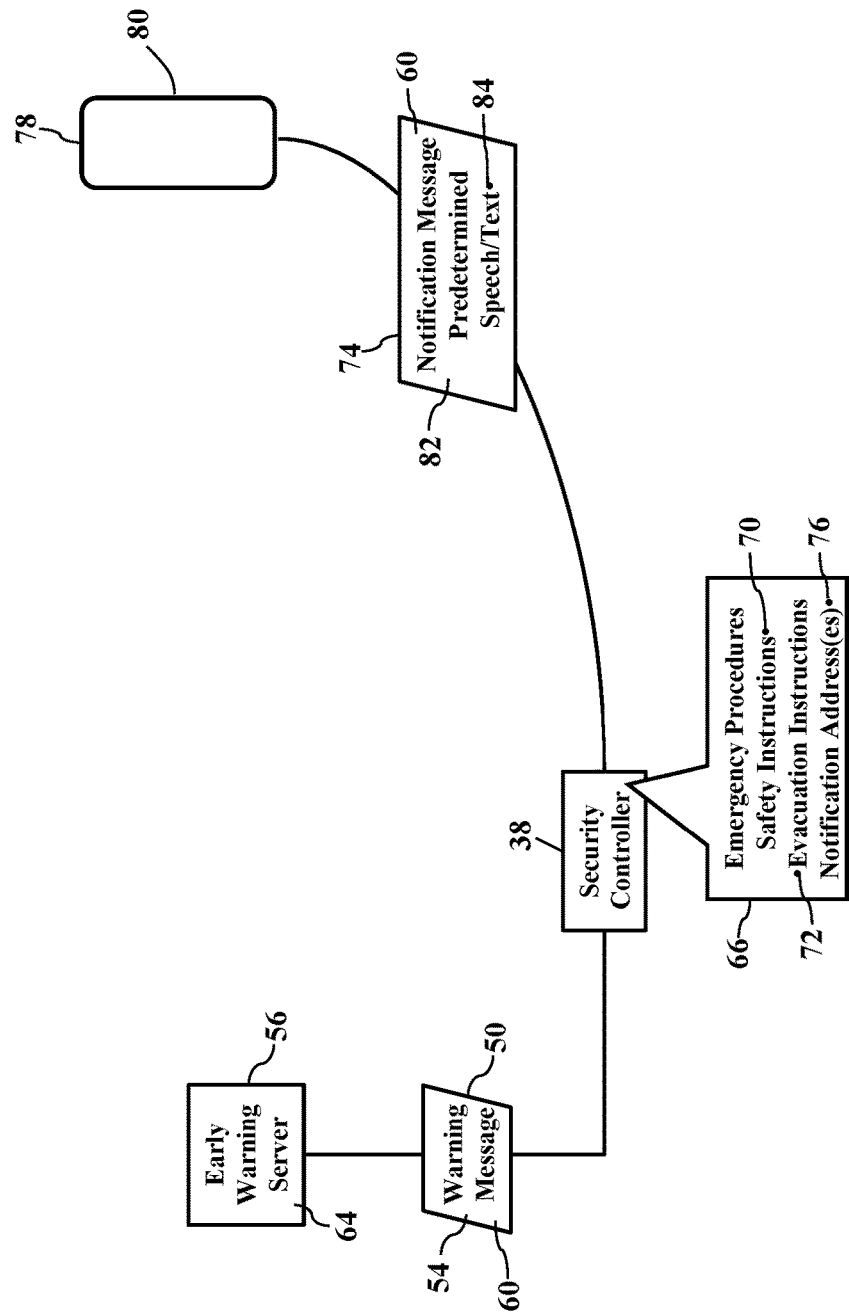

FIG. 2 illustrates some of the pre-programmed emergency procedures 66. When the security controller 38 is notified of the natural event 54 (perhaps via the warning message 50 sent from the early warning server 56), exemplary embodiments may automate the emergency procedures 66 to protect occupants and to initiate home defenses. For example, the security controller 38 may retrieve pre-defined safety instructions 70 (such as "duck and cover" during an earthquake) and/or evacuation instructions 72 (e.g., "proceed to a basement" or "seek higher ground"). The security controller 38 may thus authorize or generate an electronic notification message 74 that notifies occupants, family members, and friends of the natural event 54 (described by the warning message 50). The security controller 38 may send the notification message 74 to one or more notification addresses 76 associated with different user devices 78. FIG. 2, for simplicity, illustrates a mobile smartphone 80. When the security controller 38 is notified of the natural event 54, the security controller 38 may thus notify the mobile smartphone 80. The notification message 74 may include information that describes the natural event 54, such as a textual and/or audible description 82 of the natural event 54 and the affected geographical area 60. The notification message 74 may also include predetermined speech and/or text 84, such as the pre-defined safety instructions 70 and/or the evacuation instructions 72. The notification message 74 may be an electronic mail message sent to an email address, a short message service ("SMS") text message sent to a cellular number and/or an email address, or any other wireless or wireline notification.

Figure 3:
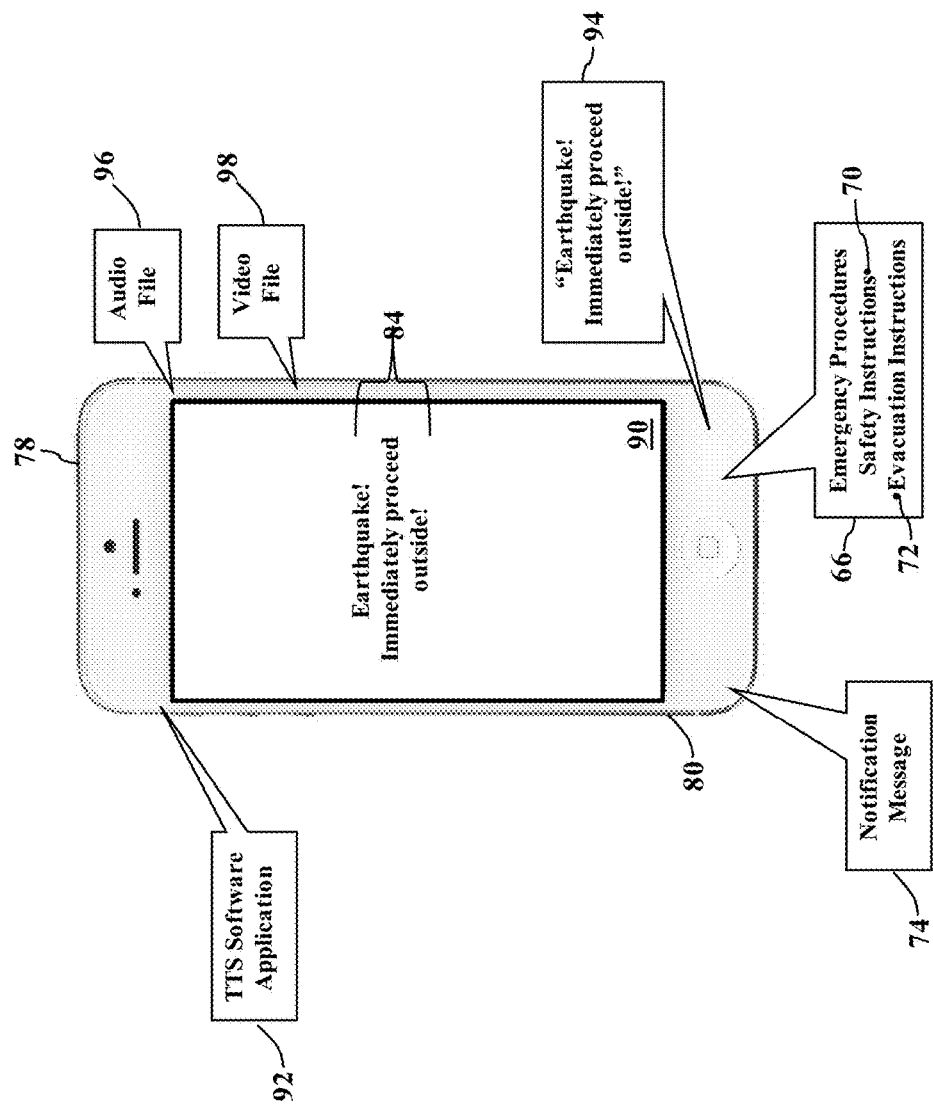

FIG. 3 further illustrates the notification message 74. When the mobile smartphone 80 receives the notification message 74, the mobile smartphone 80 processes the notification message 74 for audible and/or visual presentation. For example, the smartphone 80 may display the predetermined text 84 on its display device 90. However, the smartphone 80 may also audibly speak the predetermined text 84. That is, the smartphone 80 may store and execute a text-to-speech ("TTS") software application 92 that converts the predetermined text 84 to a voice announcement 94 (such as "Forest fire 2 miles away, begin evacuation" or "Earthquake—immediately proceed outside"). However, the notification message 74 may also cause the smartphone 80 to retrieve and play an audio file 96 and/or a video file 98. The audio file 96 and the video file 98 may be prerecorded instructions related to the pre-programmed emergency procedures 66. For example, the pre-defined safety instructions 70 and/or the evacuation instructions 72 may be sent in advance and locally for play during times of emergencies. However, the audio file 96 and the video file 98 may also be a real time audible recording, snapshot, and/or video data associated with the pre-defined safety instructions 70 and/or the evacuation instructions 72. Regardless, the audio file 96 and/or the video file 98 are executed to play an audio and/or video announcement that describes the natural event 54.

Figure 4:
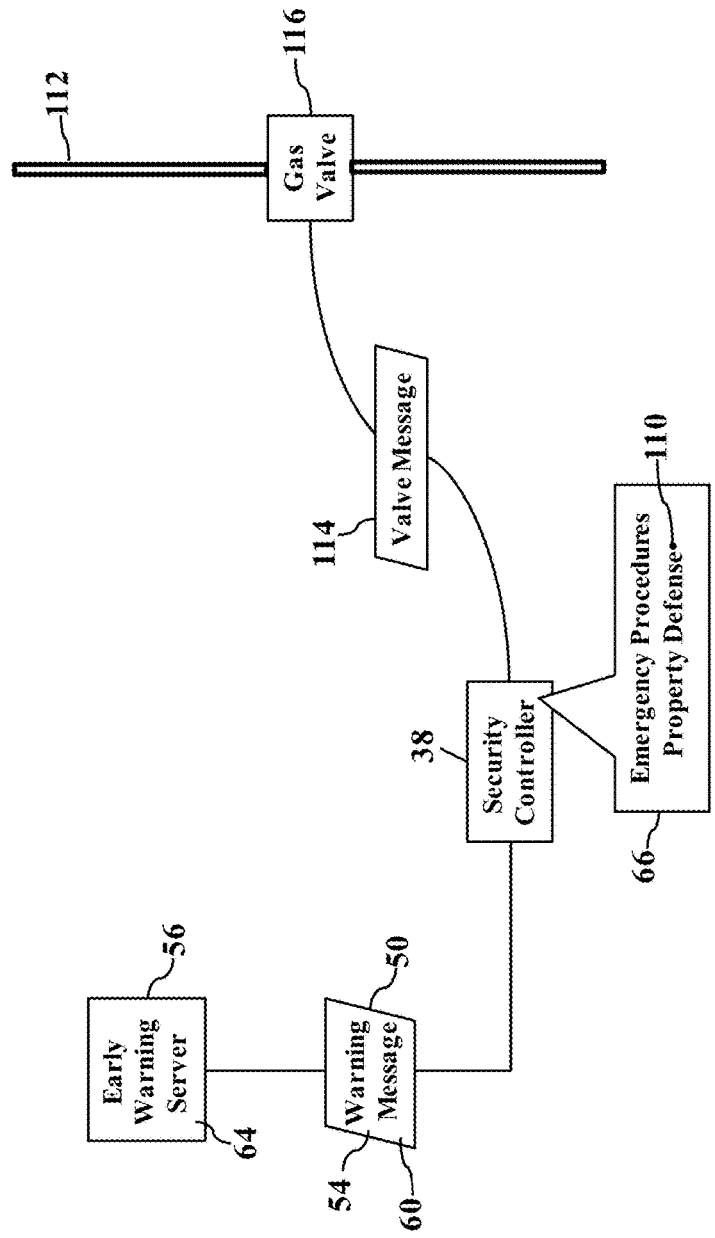

FIGS. 4-7 illustrate more of the pre-programmed emergency procedures 66. When the security controller 38 is notified of the natural event 54, exemplary embodiments automate the emergency procedures 66 to activate one or more home/business property defense systems 110. FIG. 4, for example, illustrates explosive protection. The reader may understand that many homes and businesses are served by a gas pipeline 112 that delivers or supplies natural gas or liquid propane. When the security controller 38 is notified of the natural event 54, the security controller 38 may generate and send an electronic valve message 114 to an electromechanical gas valve 116. The electronic valve message 114 instructs the electronic shut-off valve 116 to activate and/or close, thus stopping flow of flammable gas. The pre-programmed emergency procedures 66 may thus cause the gas valve 116 to shut off, thus reducing or even preventing explosion, fire, and asphyxiation.

Figure 5:
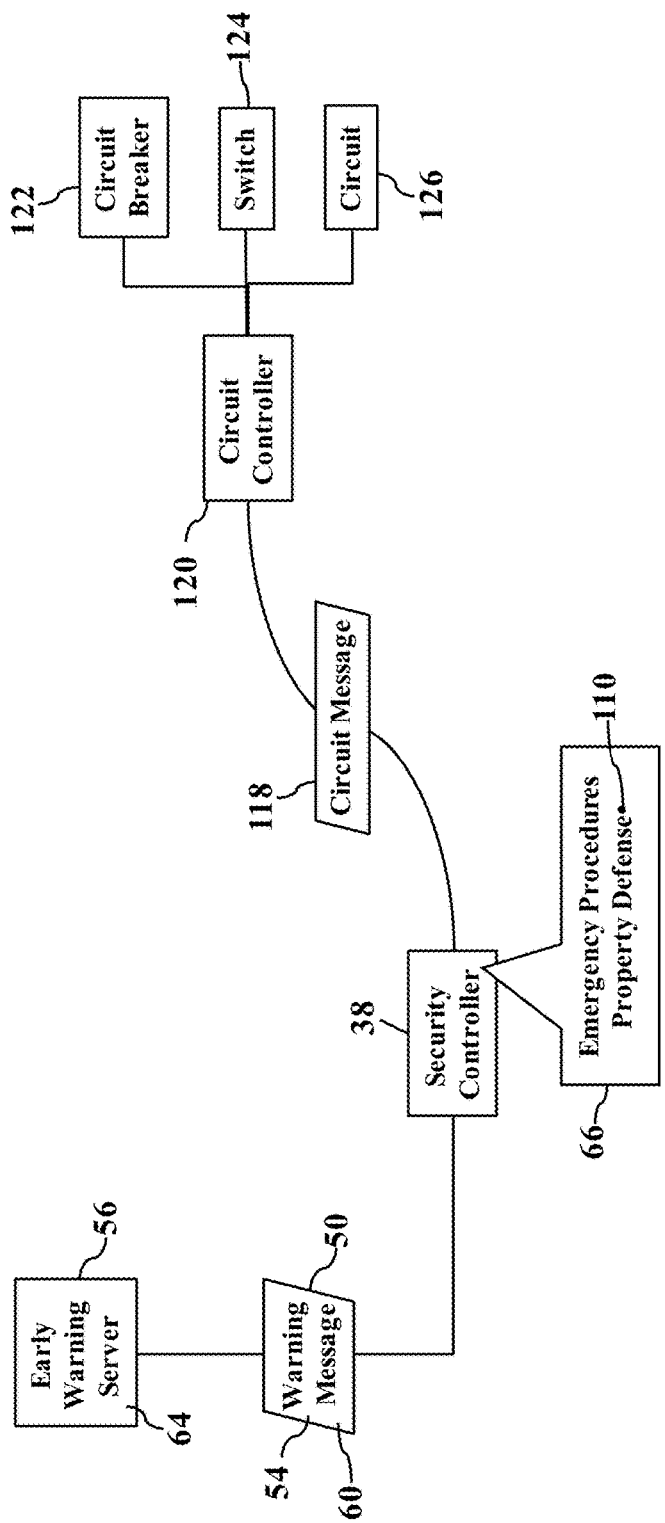

FIG. 5 illustrates electrical protection. Here the security controller 38 may cut electrical service to prevent electrocution, explosion, and fire. When the security controller 38 is notified of the natural event 54, the security controller 38 may generate and/or send an electronic circuit message 118 to an electrical circuit controller 120. The electronic circuit message 118 instructs the electrical circuit controller 120 to open any circuit breakers 122, switches 124, and/or electrical circuits 126. Exemplary embodiments may thus sever or disconnect current and voltage to reduce or even prevent electrocution, explosion, and fire.

Figure 6:
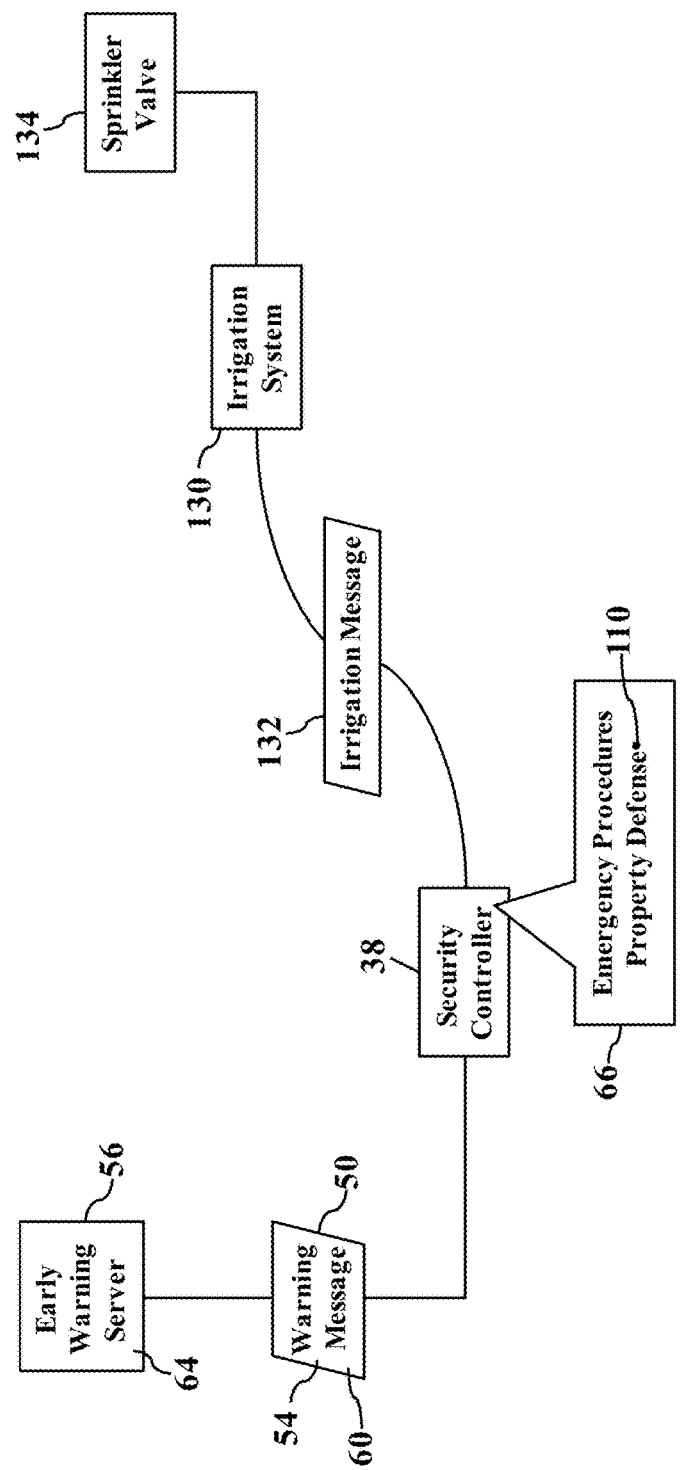

FIG. 6 illustrates sprinkler protection. Here the security controller 38 may activate a water irrigation system 130 to reduce fire damage. Suppose, for example, that the security controller 38 is notified of a wild fire. The security controller 38 may thus generate and/or send an electronic irrigation message 132. The electronic irrigation message 132 instructs the water irrigation system 130 to open any sprinkler valves 134. Exemplary embodiments may water lawns and shrubs to reduce or suppress the chance of fire. Moreover, electronic irrigation message 132 may instruct the water irrigation system 130 to soak exterior structures to further reduce the possibility of fire damage.

Figure 7:
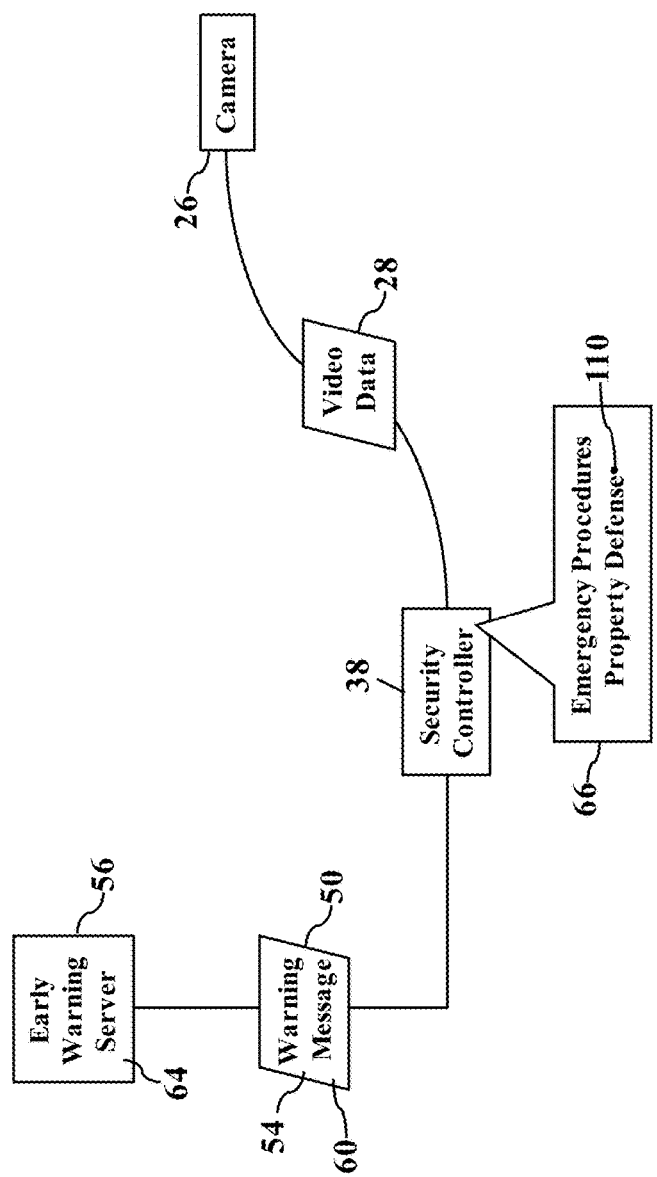

FIG. 7 illustrates video activation. Here the security controller 38 may activate, command, and/or turn on the digital camera 26 during any emergency event. During an earthquake, for example, the camera 26 may capture and send the live video data 28 to document tremoral damage. Should a wild fire approach, the live video data 28 documents its approach to help firefighters. The live video data 28 may also be helpful with insurance claims. Moreover, should the security controller 38 be notified of a missing or kidnapped person (e.g., an amber alert), the security controller 38 may activate the digital camera 26 as video surveillance.

Exemplary embodiments thus protect during the natural event 54. Conventional security systems react to very local emergency events. That is, conventional security systems monitor their local sensors to protect occupants from fire, intrusion, and other security conditions. Here, though, exemplary embodiments notify of the natural event 54 that occurs outside the home or business. That is, the security controller 38 responds to the natural event 54 that occurs outside, or external to, the sensors 24 monitoring the home or business. When the early warning system 52 notifies the early warning server 56 (perhaps via the emergency message 58), the early warning server 56, in turn, may warn the population 64 of security controllers in the geographical area 60 associated with the natural event 54. Exemplary embodiments, in other words, warn of natural disasters and other forecastable events that occur external to the sensors monitoring the home or business. The early warning server 56 thus acts as a centralized notification node to warn security systems of the natural event 54. Exemplary embodiments may interconnect existing and future early warning systems such that location, timing and even magnitude information (supplied by the early warning system 52) may drive the early warning server 56 to determine the affected population 64 of security controllers. The early warning server 56 may thus broadcast the warning message 50 to the population 64 of security controllers at an appropriate time and with enough data for implementation of the pre-programmed emergency procedures 66. Exemplary embodiments thus warn the population 64 of security controllers that may experience the natural event 54.

Exemplary embodiments improve health and safety. Because the security controller 38 warns of the natural event 54, occupants may have precious extra seconds, or even minutes, to take precautionary measures. Life and property may thus be protected with very short lead times and without human intervention.

Figure 8:
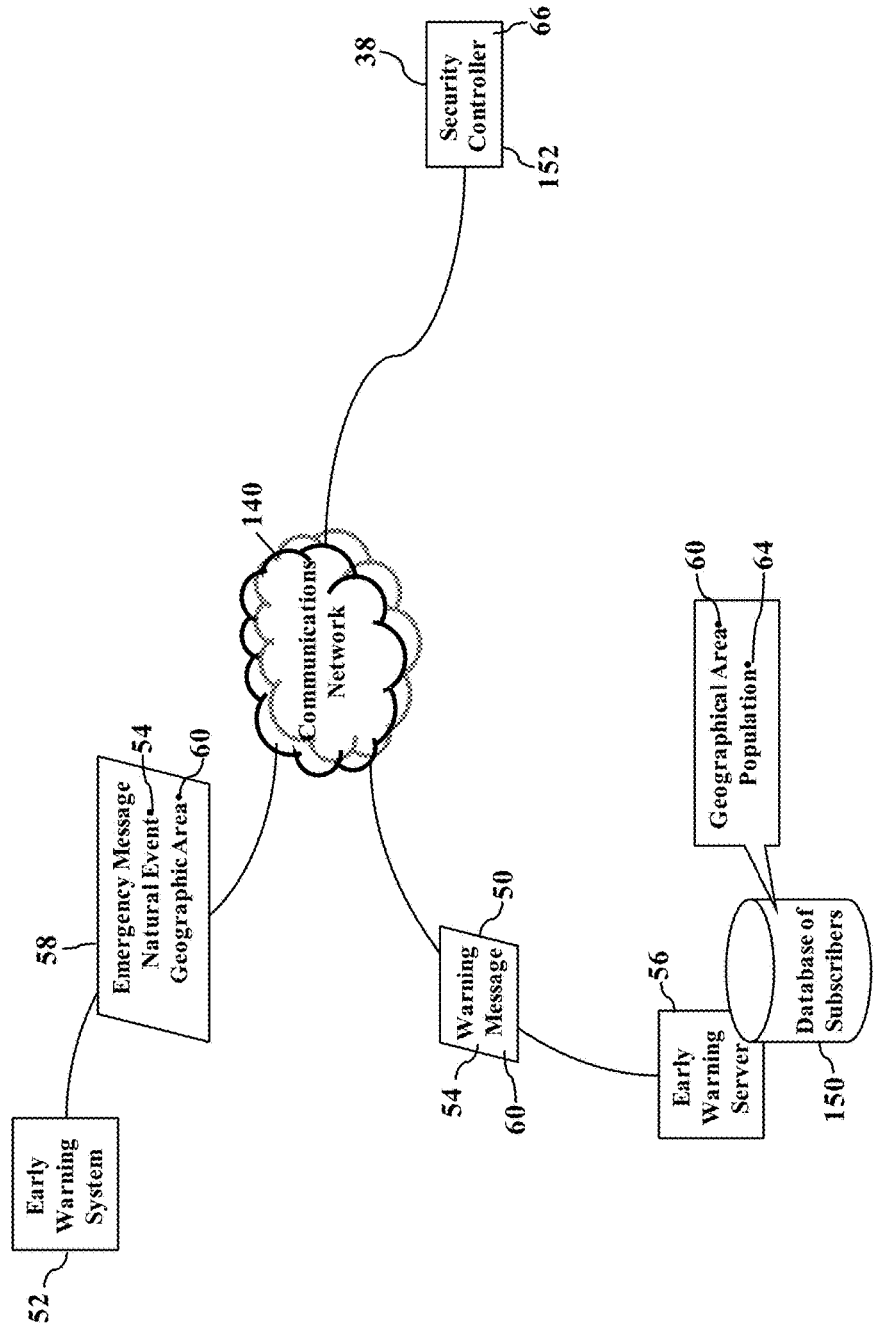
FIGS. 8-9 are more detailed illustrations of the operating environment, according to exemplary embodiments.
Figure 9:
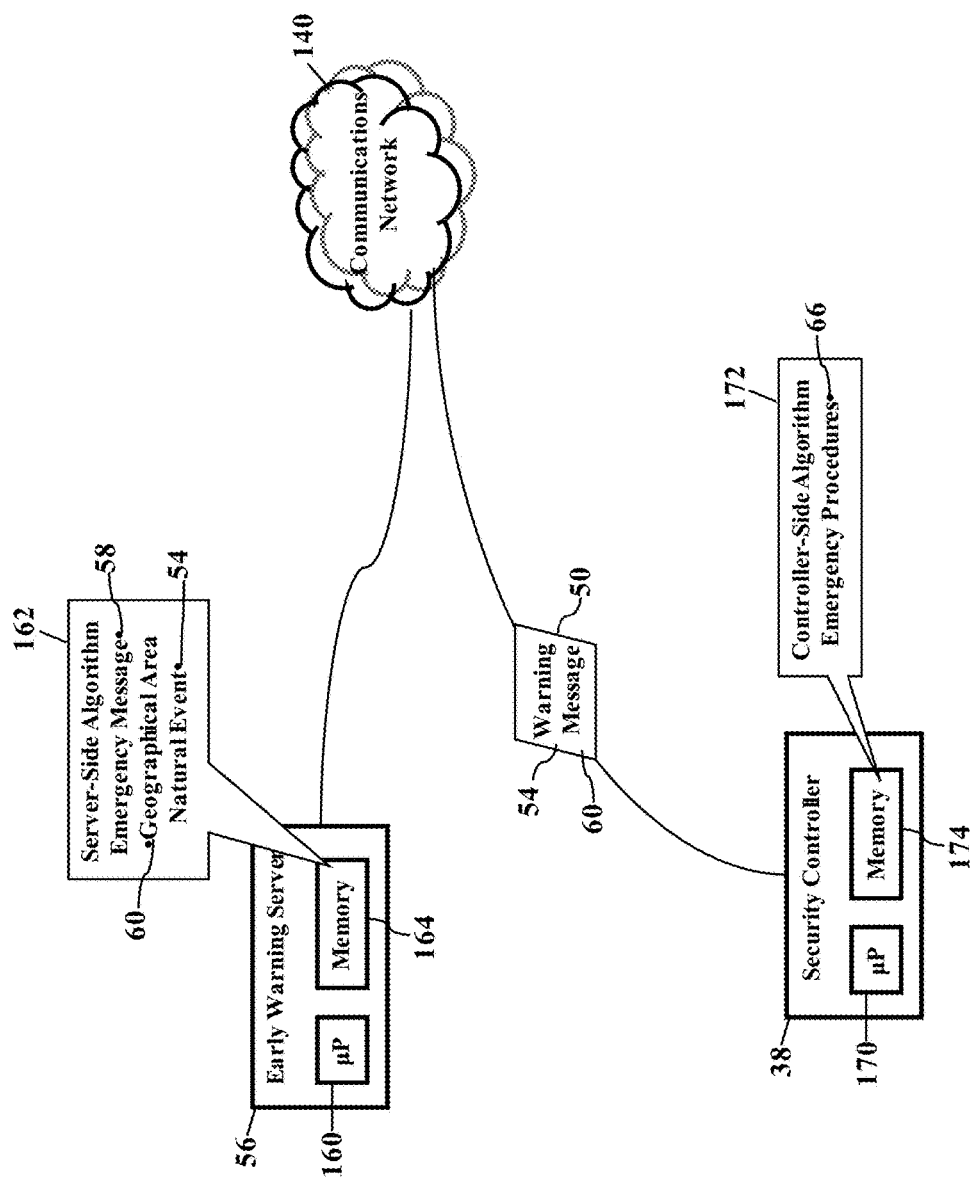

FIGS. 8-9 are more detailed illustrations of the operating environment, according to exemplary embodiments. The early warning system 52 communicates with the early warning server 56 via a communications network 140. The early warning server 56 also communicates with the security controller 38 via the communications network 140. When the early warning system 52 detects the natural event 54 (such an earthquake, tornado, hurricane, or fire), the early warning system 52 notifies the early warning server 56. FIG. 8, for example, illustrates the early warning system 52 sending the emergency message 58 to a network address associated with the early warning server 56. The emergency message 58 describes the geographical area 60 associated with the natural event 54. The early warning server 56 inspects the emergency message 58 (such as a field or information in a header or payload packet) for data or information describing the geographical area 60. The early warning server 56 then queries an electronic database 150 of subscribers for the geographical area 60. The early warning server 56 thus retrieves the affected population 64 of security controllers that generally match the geographical area 60 associated with the natural event 54. The early warning server 56 sends the warning message 50 to the network addresses 152 that correspond to the population 64 of security controllers operating or installed in the vicinity of the geographical area 60 associated with the natural event 54. FIG. 8, for example, illustrates the warning message 50 routing to the network address 152 associated with the security controller 38. The security controller 38 may thus execute the pre-programmed emergency procedures 66 to protect life and property before, during, and after the natural event 54.

FIG. 9 illustrates more details of the operating environment. The early warning server 56 has a processor 160 (e.g., "μP"), application specific integrated circuit (ASIC), or other component that executes a server-side algorithm 162 stored in a memory 164. The server-side algorithm 162 instructs the processor 160 to perform operations, such as receiving the emergency message 58 and determining the affected geographical area 60 associated with the natural event 54. The security controller 38 also has a processor 170 (e.g., "μP"), application specific integrated circuit (ASIC), or other component that executes a controller-side algorithm 172 stored in a memory 174. The controller-side algorithm 172 instructs the processor 170 to perform operations, such as receiving the warning message 50 associated with the natural event 54 and implementing the pre-programmed emergency procedures 66. The server-side algorithm 172 and the controller-side algorithm 172 may thus cooperate, perhaps in a server-client or messaging environment, to warn of natural disasters.

Exemplary embodiments may packetize. The security controller 38 and the early warning server 56 have one or more network interfaces to the communications network 140. The network interface may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having wireless cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
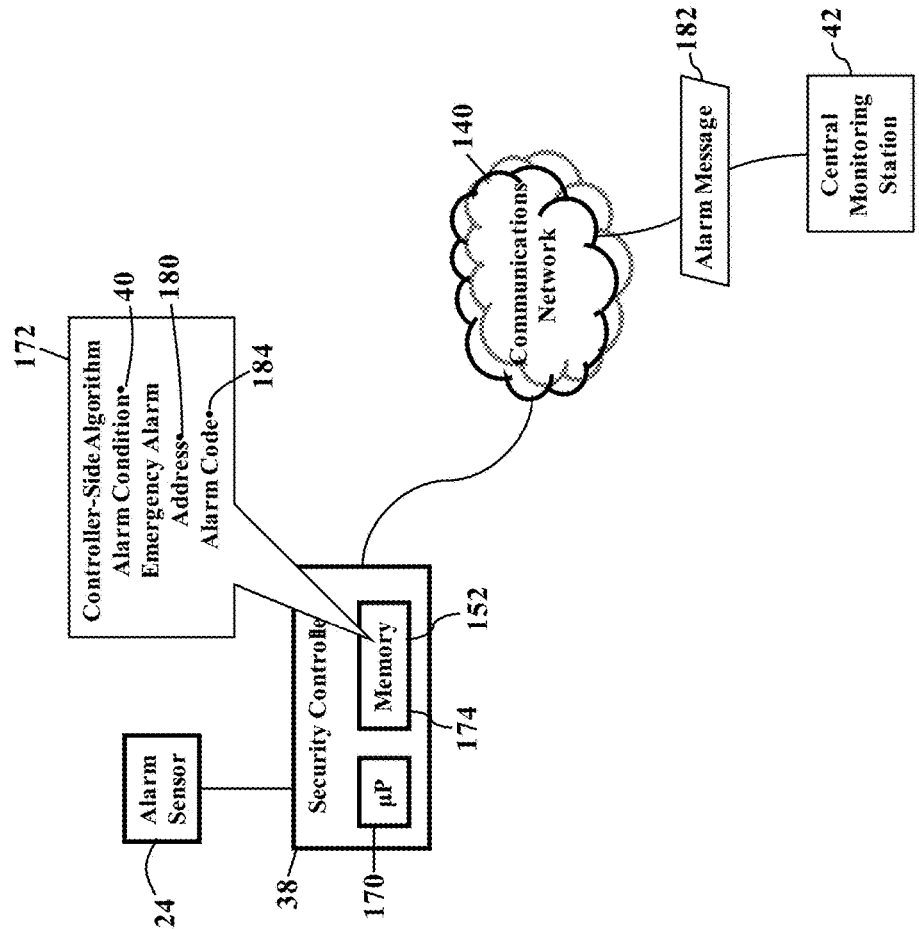
FIG. 10 illustrates centralized monitoring, according to exemplary embodiments.

FIG. 10 illustrates centralized monitoring, according to exemplary embodiments. The controller-side algorithm 172 causes the alarm controller 38 to monitor the inputs, outputs, status, and/or state of the alarm sensors 24. When the controller-side algorithm 172 determines the alarm condition 40, the controller-side algorithm 172 may instruct the processor 170 to notify the central monitoring station 42. That is, the security controller 38 retrieves an emergency alarm address 180 associated with the central monitoring station 42. The emergency alarm address 180 is a network communications address at which the central monitoring station 42 receives alarm messages from customers or subscribers of an alarm monitoring service. The controller-side algorithm 172 generates and sends an alarm message 182 to the emergency alarm address 180. The alarm message 182 includes data that describes the alarm condition 40, such as an alarm code 184 and/or an identifier of alarm sensor 24 detecting an abnormal measurement or reading. The alarm message 182 may also include information uniquely describing the security system 20, such as the Internet Protocol address 152 assigned to the alarm controller 38. The alarm message 182 is routed into the communications network 140 (such as a private cellular data network and/or a private data network) for delivery to the emergency alarm address 180. The alarm message 182 may thus be packetized according to a packet protocol (such as the IPv4 or IPv6 protocols). When a server associated with the central monitoring station 42 receives the alarm message 182, the central monitoring station 42 may contact emergency services, as is known.

Figure 11:
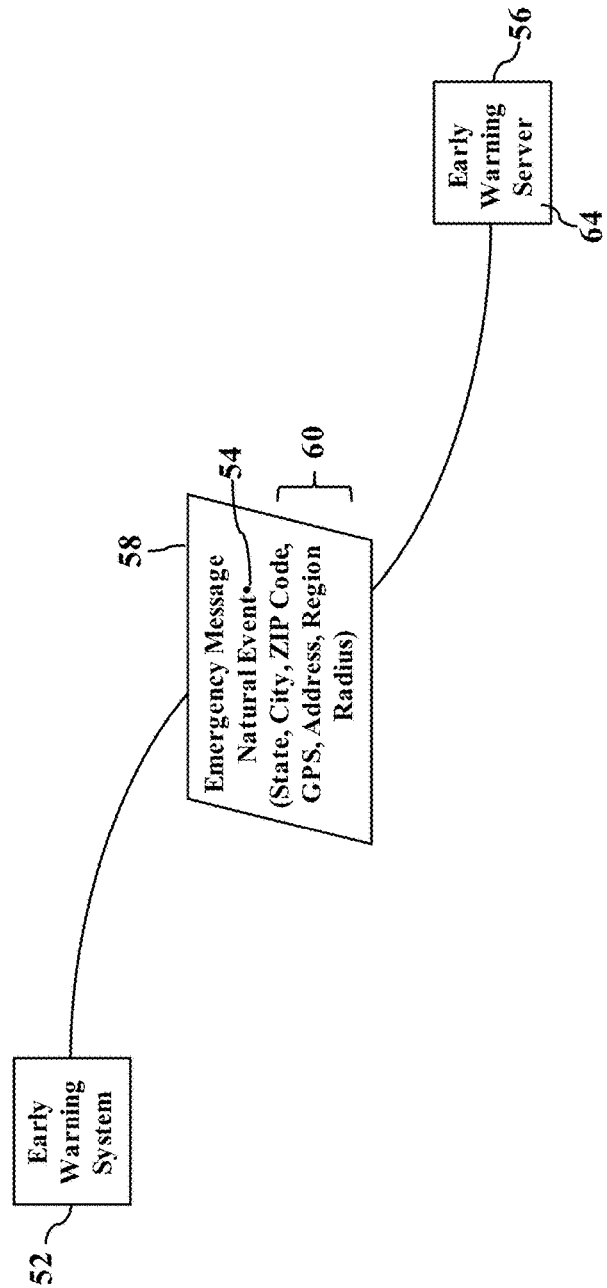
FIG. 11 illustrates geographical alerts, according to exemplary embodiments.

FIG. 11 illustrates geographical alerts, according to exemplary embodiments. When the early warning system 52 detects an earthquake, tornado, hurricane, fire, or other natural event 54, the early warning system 52 sends the emergency message 58 to the network address associated with the early warning server 56. The early warning server 56 may thus interface with the public or private early warning system 52 to distribute warnings to affected subscribers. The early warning server 56, for example, may be operated on behalf of, and/or associated with, a service provider (such as a subscription-based security service or municipal/governmental service). Regardless, when the early warning system 52 sends the emergency message 58, the emergency message 58 describes the geographical area 60 associated with the natural event 54. Suppose, for example, that the early warning system 52 operates on behalf of the U.S. Geological Service to warn of earthquakes. The geographical area 60 may thus be specified as a state-wide alert (e.g., California or Oklahoma), one or more zone improvement plan (or "ZIP") codes, and/or global positioning system ("GPS") coordinates or information. The geographical area 60 may additionally or alternatively specify a county/city name, street name, building name, street address, or a regional description (e.g., a "tri-county area" or the "San Francisco bay area"). The geographical area 60 may even specify a radius in miles/kilometers about some central location. Exemplary embodiments may thus describe the geographical area 60 in any terms that localizes the natural event 54 to an affected area.

Figure 12:
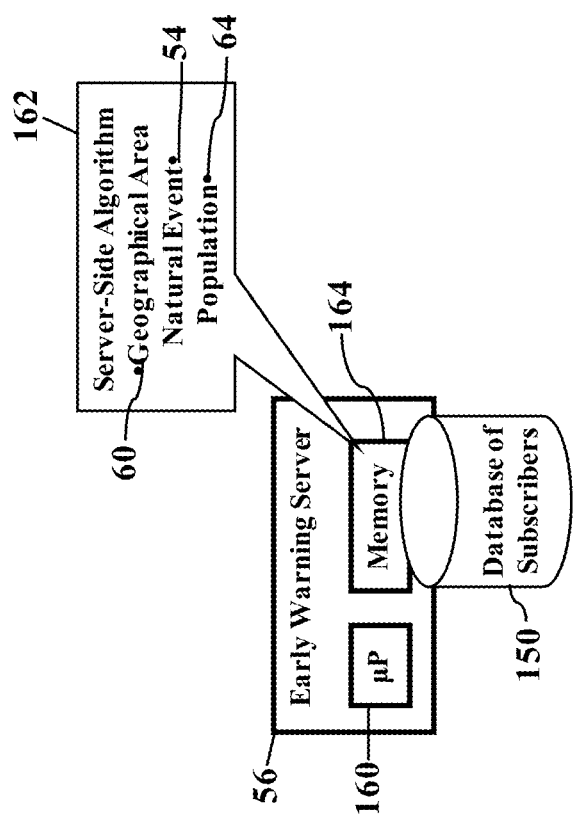
FIGS. 12-14 illustrate a population of security controllers, according to exemplary embodiments.
Figure 13:
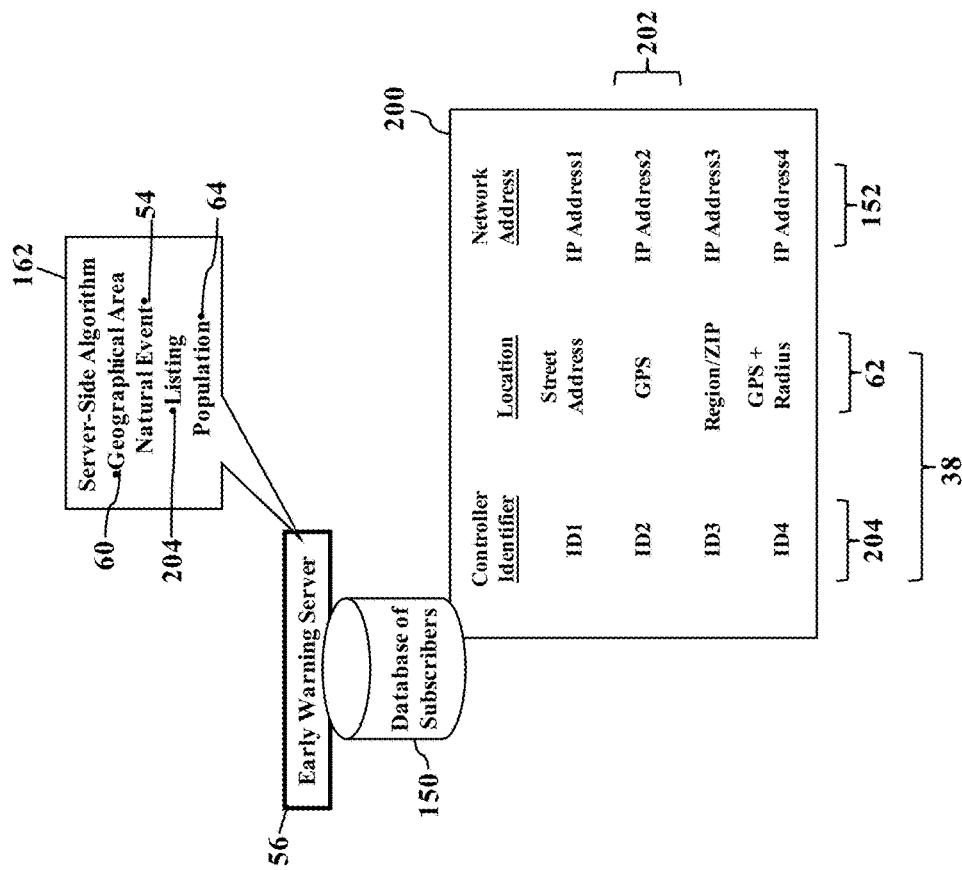
Figure 14:
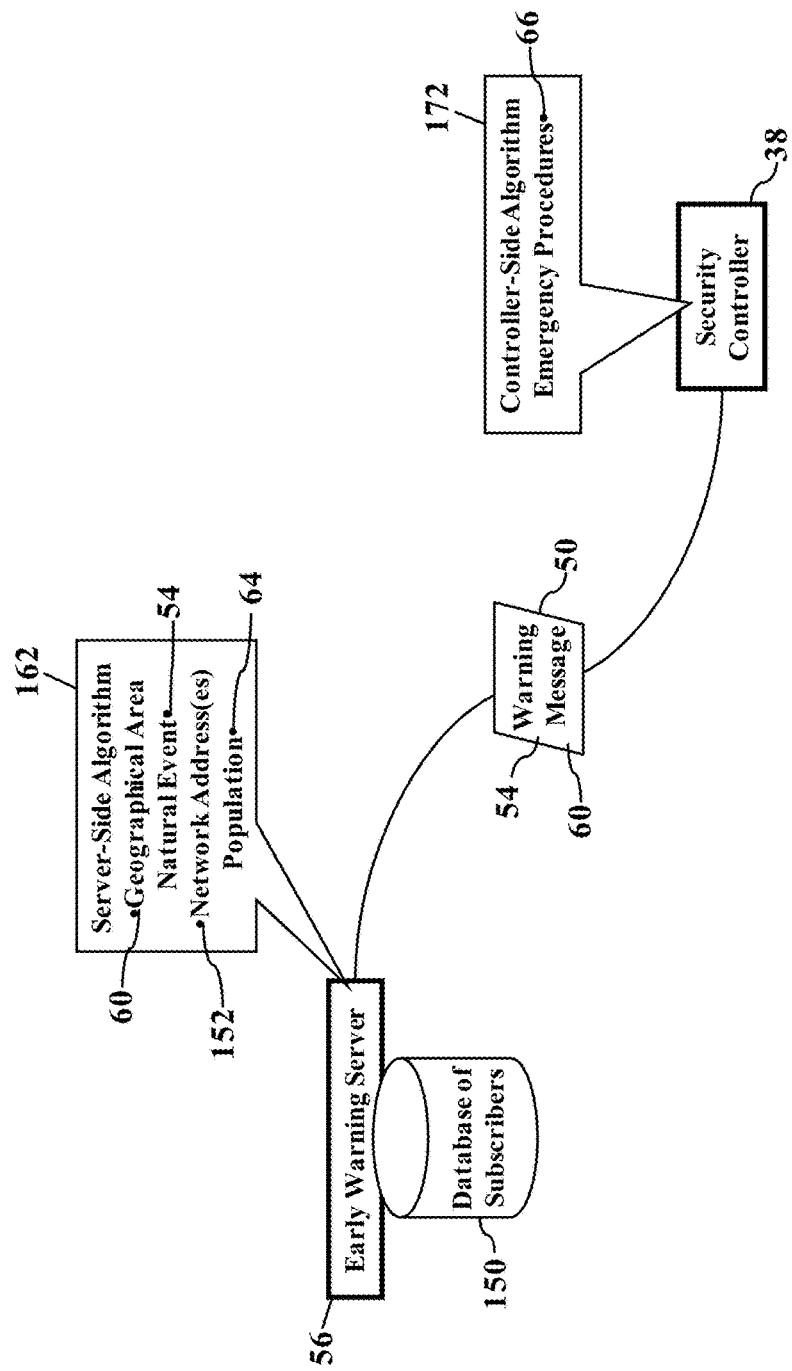

FIGS. 12-14 illustrate the affected population 64 of security controllers, according to exemplary embodiments. Once the early warning server 56 is notified of the natural event 54 (as explained with reference to FIG. 11), the early warning server 56 queries the electronic database 150 of subscribers for the geographical area 60. FIG. 12 illustrates the electronic database 150 of subscribers as being locally stored in the memory 164 of the early warning server 56, yet the electronic database 150 of subscribers may be remotely stored at some other network location. The early warning server 56 retrieves the affected population 64 of security controllers that generally match the geographical area 60 associated with the natural event 54.

FIG. 13 illustrates electronic database associations. The electronic database 150 of subscribers is illustrated as a table 200 that maps, relates, or associates different security controllers 38 to different operational locations 62 and to their corresponding network addresses 152. The electronic database 150 of subscribers may thus store an entry 202 that associates a unique identifier 204 associated with the corresponding security controller 38, its corresponding location 62, and its corresponding network address 152. The location 62 may be defined as its installed location (such as a street, city, and/or state), its operating/installed ZIP code, and/or its installed global positioning system ("GPS") coordinates or information (as earlier explained). Regardless, the early warning server 56 queries the electronic database 150 of subscribers for the geographical area 60 experiencing the natural event 54 and retrieves the network addresses 152 having electronic database associations with the same or similar location 62. The early warning server 56 may retrieve a listing 204 of the network addresses 152 electronically associated with the geographical area 60. Exemplary embodiments thus determine the population 64 of security controllers that that generally match the geographical area 60 associated with the natural event 54.

FIG. 14 illustrates the warning message 50. Once the network addresses 152 are determined (from the electronic database 150 of subscribers), the server-side algorithm 162 instructs the early warning server 56 warn the affected population 64 of security controllers. The server-side algorithm 162 causes the early warning server 56 to generate the warning message 50 describing the geographical area 60 associated with the natural event 54. The server-side algorithm 162 instructs the early warning server 56 to send the warning message 50 to each network address 152 in the population 64 of security controllers affected by the natural event 54. When the security controller 38 receives the warning message 50, the security controller 38 is thus notified of the environmental or natural disaster and executes the pre-programmed emergency procedures 66 to protect life and property before, during, and after the natural event 54.

Figure 15:
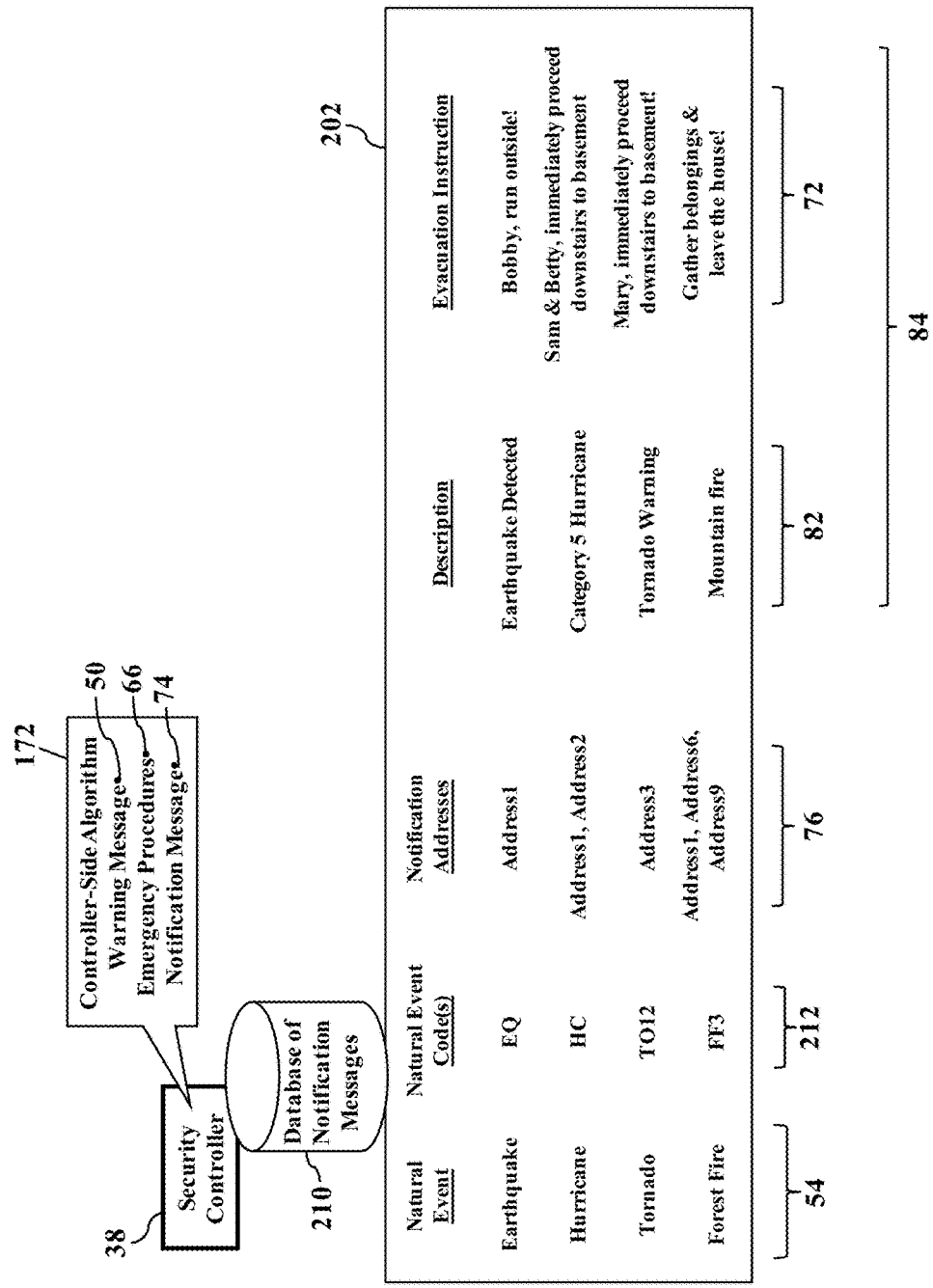
FIG. 15 illustrates evacuation instructions, according to exemplary embodiments.

FIG. 15 further illustrates the evacuation instructions 72, according to exemplary embodiments. Here exemplary embodiments permit user-defined evacuation routes, safety instructions, and other emergency text. As FIG. 15 illustrates, the security controller 38 may store and/or access a database 210 of notification messages when notified of the natural event 54. Here exemplary embodiments may define the predetermined text 84 for different natural disasters 54. For example, the user may define the personal evacuation instructions 72 for each recipient of the notification message 74. Suppose, for example, mom and dad want the child's smartphone 80 (illustrated in FIGS. 2-3) to repeatedly announce "Bobby, run outside!" during an earthquake. Mom and dad may thus personalize the database 210 of notification messages with the evacuation instruction 72. That is, the database 210 of notification messages is configured with electronic database associations between the natural event 54, the child's notification address 76, and the predetermined text 84. Each different natural event 54 may thus be uniquely identified with a code 212. When the security controller 38 receives the warning message 50, the code 212 may be information or data contained within a packet header or payload. Each different code 212 may thus be electronically associated with the corresponding notification address(es) 76 and the corresponding predetermined text 84.

FIG. 15 also illustrates different evacuation instructions 72. As the reader may understand, there may be many different evacuation paths from the home or business, depending on the natural disaster. An earthquake, for example, likely has a different evacuation route than a tornado or a hurricane. Exemplary embodiments thus permit personalization with different evacuation instructions 72 for different natural events 54. That is, the database 210 of notification messages may be configured with electronic database associations between different codes 212, the corresponding notification addresses 76, the disaster description 82, and the different evacuation instructions 72. When the security controller 38 receives the warning message 50, the controller-side algorithm 172 may instruct the security controller 38 to query the database 210 of notification messages for the code 212 and retrieve the corresponding notification addresses 76 and evacuation instruction 72. The user may thus configure the database 210 of notification messages to provide a path to safety during different natural events 54. The recipient of the notification message 74 thus reads or hears the evacuation instruction 72 that corresponds to the code 212. A residential or business user may thus define different evacuation paths from different rooms in the home or business, depending on the triggering code 212.

Figure 16:
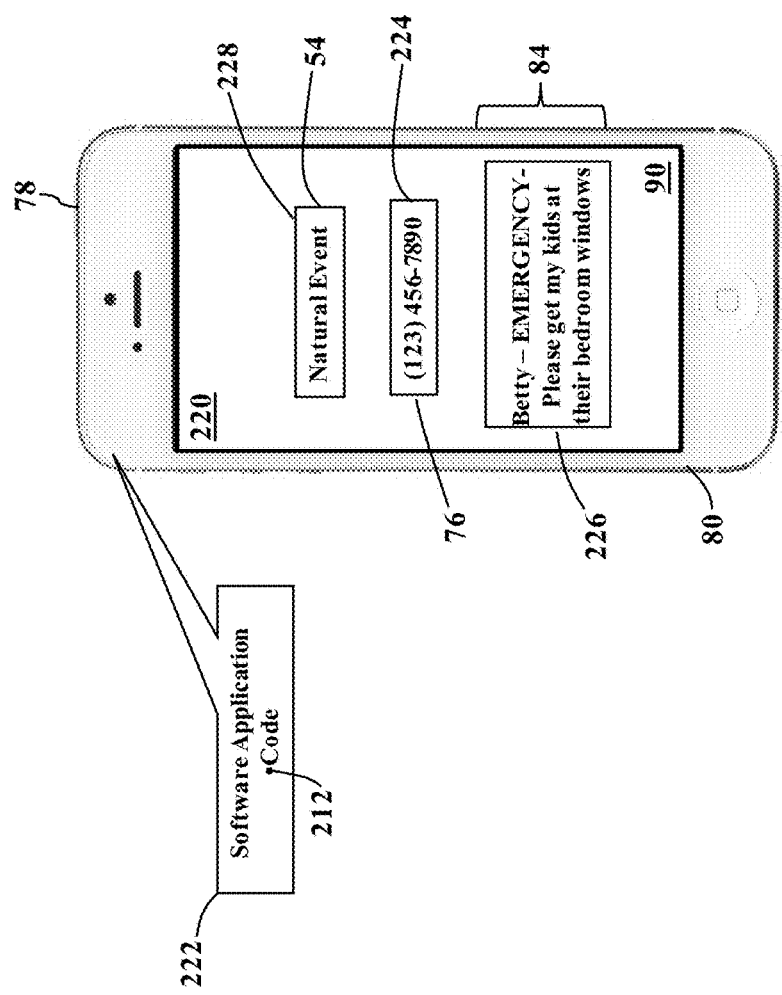
FIG. 16 illustrates personal notifications, according to exemplary embodiments.

FIG. 16 further illustrates personal notifications, according to exemplary embodiments. This disclosure explains how occupants, family members, and friends may be remotely notified during natural disasters. Yet different recipients may receive different remote notifications, depending on the entries in the database 210 of notification messages. That is, the database 210 of notification messages may store electronic database associations between different codes 212, different notification addresses 76, and different predetermined text 84. Exemplary embodiments may thus personalize remote notification based solely on the natural event 54, without having to determine a current location of the smartphone 80.

FIG. 16 illustrates a graphical user interface 220. The graphical user interface 220 may be generated by a mobile software application 222 downloaded to, and executed by, the smartphone 80. The graphical user interface 220 displays an address data field 224 in which the user enters the desired notification address(es) 76. The graphical user interface 220 may also display a text data field 226 in which the user types the corresponding predetermined text 84. The graphical user interface 220 may also display the corresponding natural event 54 (such as the disaster description 82 illustrated in FIG. 15) in an event data field 228. The user types the desired notification address(es) 76 and the desired predetermined text 84, such as the evacuation instruction 72. The evacuation instruction 72 may thus be personalized according to the recipient's age, relation, and/or the emergency (e.g., the code 212). A neighbor's smartphone, for example, may receive "Betty—EMERGENCY—Please get my kids at their bedroom windows." Grandma's and grandpa's smartphones may receive "Tornado—down in basement." So, not only will exemplary embodiments quickly notify fire, police, and other emergency personnel, but exemplary embodiments may also notify loved ones and friends.

Geographic location need not be considered. When a natural disaster occurs, occupants are the overriding concern. That is, people in the home or office building are the priority for remote notification. If the smartphone 80 has GPS coordinates miles away, the user is presumably safe from the natural disaster. Exemplary embodiments may thus only retrieve and send the evacuation instructions 72 to those in harm's way. The security controller 38 may thus maintain a connectivity log of WI-FI® service. The security controller 38 may have a WI-FI® or other wireless local area network transceiver that acts as an access point to a wireless network. If any one of the remote notification addresses 76 is currently registered to the WI-FI® network, the controller-side algorithm 172 may prioritize the evacuation instructions 72 to those notification addresses 76 being served or reachable via the WI-FI® network. The controller-side algorithm 172 may thus disregard or delay sending the evacuation instructions 72 to any notification addresses 76 not reachable via the WI-FT® network.

Exemplary embodiments thus warn of natural disasters. Exemplary embodiments may receive data feeds from weather bureaus, police, fire, and other emergency services. Exemplary embodiments may thus warn of any emergency situation, such as an approaching storm or tornado. Exemplary embodiments may receive updates from a local or national police department describing a school emergency, shooting, or kidnapping.

Figure 17:
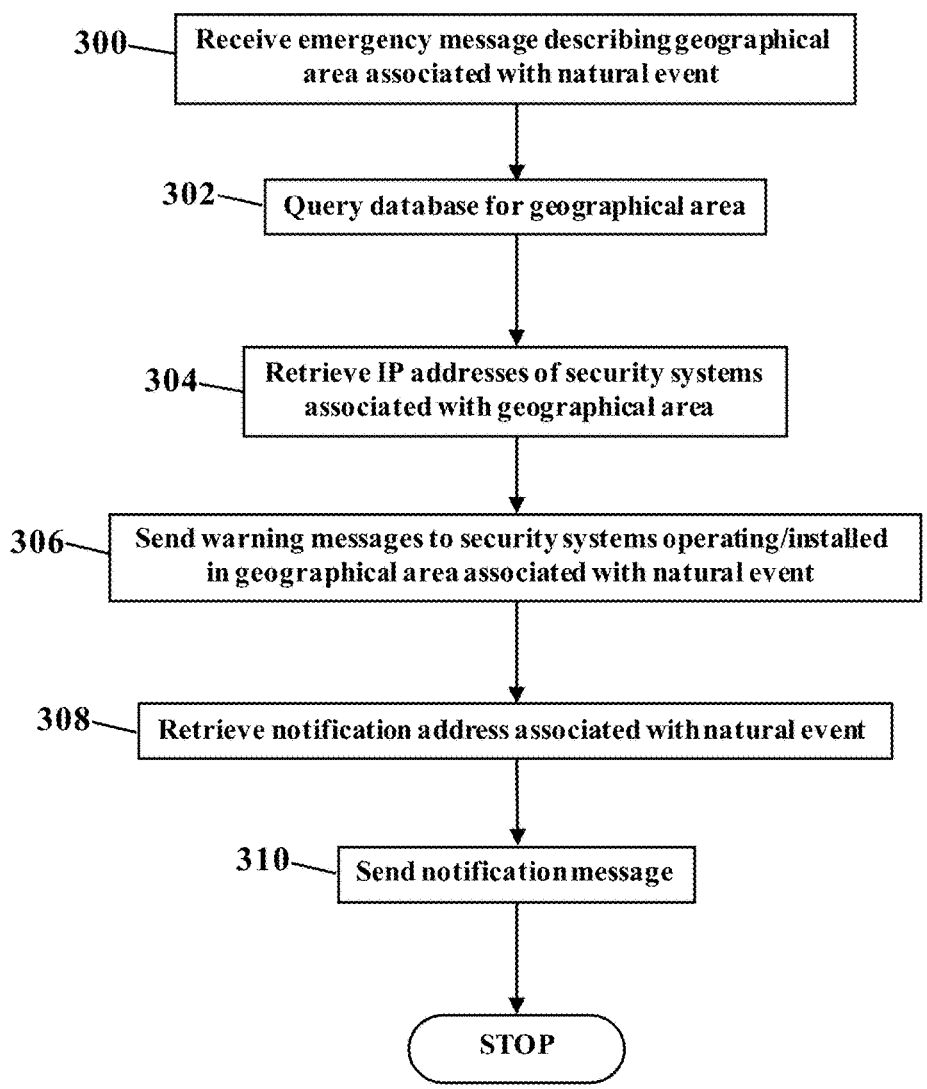
FIG. 17 is a flowchart illustrating a method or algorithm for security monitoring, according to exemplary embodiments.

FIG. 17 is a flowchart illustrating a method or algorithm for security monitoring, according to exemplary embodiments. When the early warning system 52 detects the natural event 54 (such an earthquake, tornado, hurricane, or fire), the early warning system 52 sends the emergency message 58 to the network address associated with the early warning server 56 (Block 300). The emergency message 58 describes the geographical area 60 associated with the natural event 54. The early warning server 56 then queries the electronic database 150 of subscribers for the geographical area 60 (Block 302). The early warning server 56 thus retrieves the database entries logging the security systems operating or installed in the geographical area 60 about to experience the natural event 54 (Block 304). The early warning server 56 sends the warning message 50 to the network addresses 152 that correspond to the population 64 of security controllers operating or installed in the vicinity of the geographical area 60 associated with the natural event 54 (Block 306). The notification addresses 76 may be retrieved (Block 308) and the notification messages may be sent (Block 310).

Figure 18:
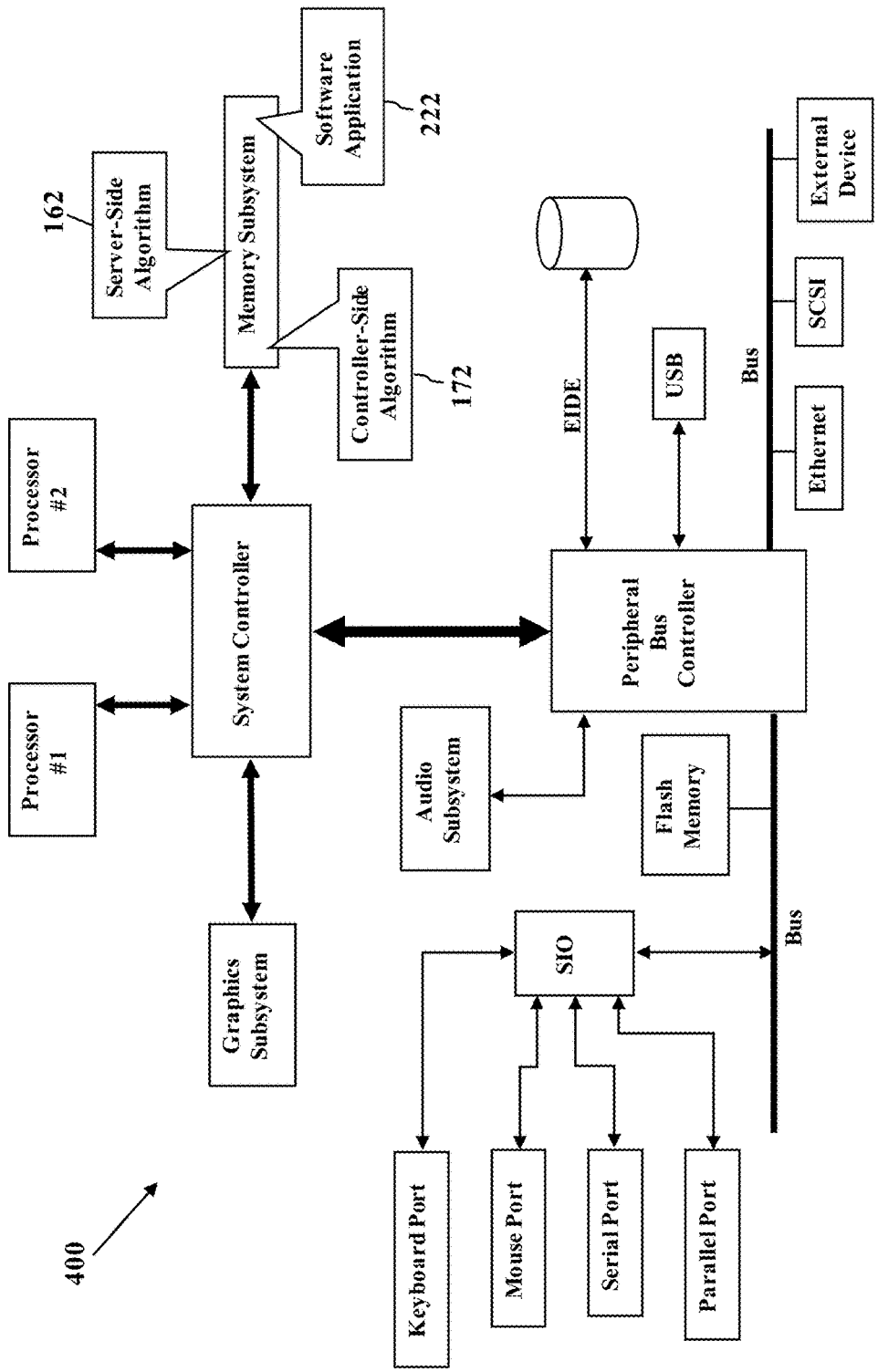
FIGS. 18-23 depict still more operating environments for additional aspects of the exemplary embodiments.

FIG. 18 is a schematic illustrating still more exemplary embodiments. FIG. 18 is a more detailed diagram illustrating a processor-controlled device 400. As earlier paragraphs explained, the server-side algorithm 162, the controller-side algorithm 172, and/or the software application 222 may partially or entirely operate in any mobile or stationary processor-controlled device. FIG. 218, then, illustrates the server-side algorithm 162, the controller-side algorithm 172, and/or the software application 222 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 19:
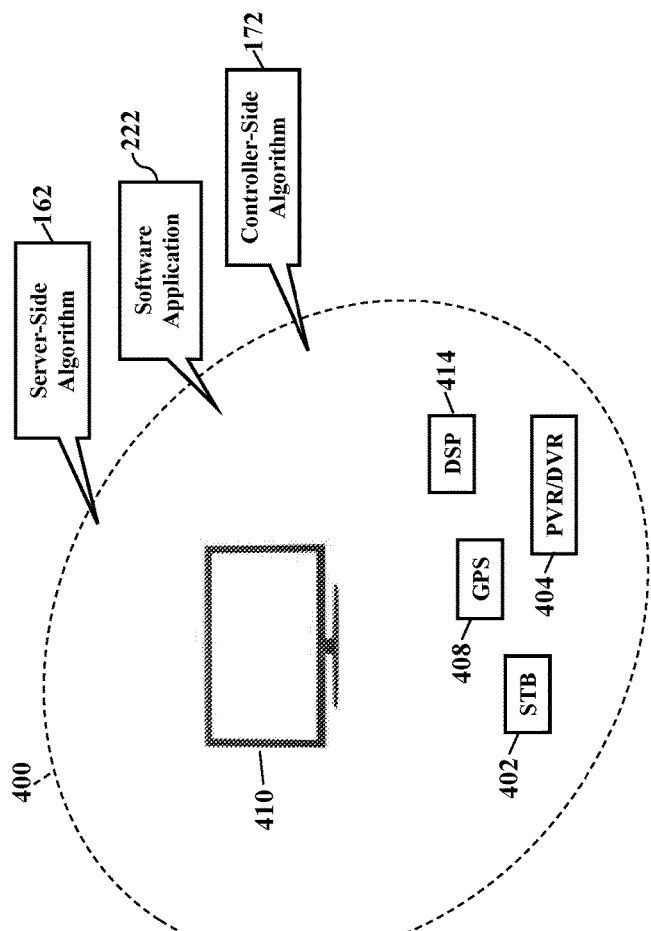

FIG. 19 depicts other possible operating environments for additional aspects of the exemplary embodiments. FIG. 19 illustrates the server-side algorithm 162, the controller-side algorithm 172, and/or the software application 222 operating within various other processor-controlled devices 400. FIG. 19, for example, illustrates that the server-side algorithm 162, the controller-side algorithm 172, and/or the software application 222 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 20:
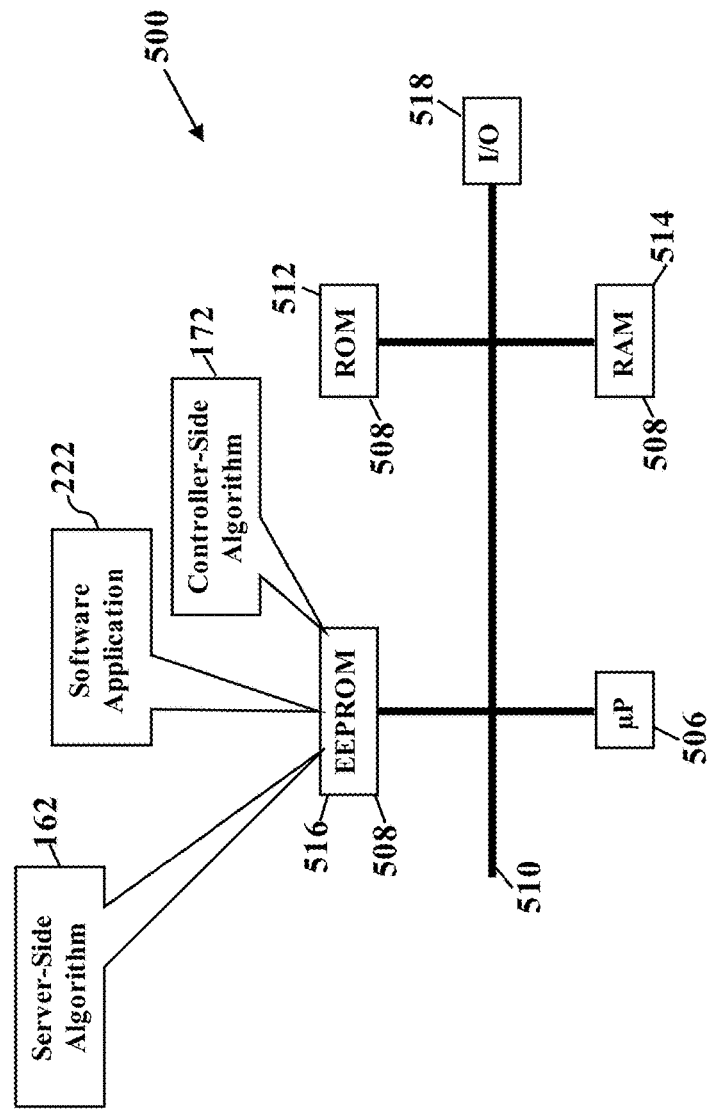
Figure 21:
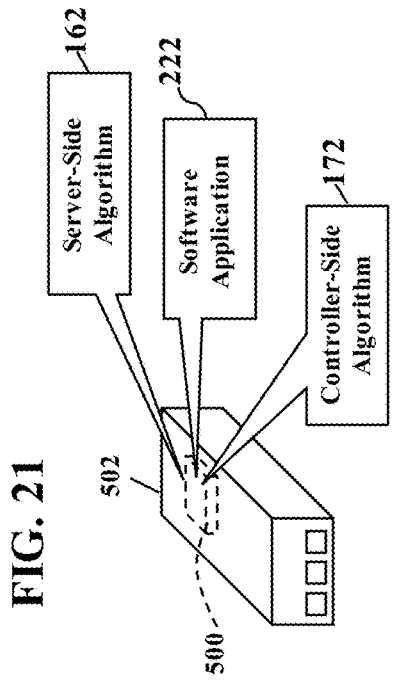
Figure 22:
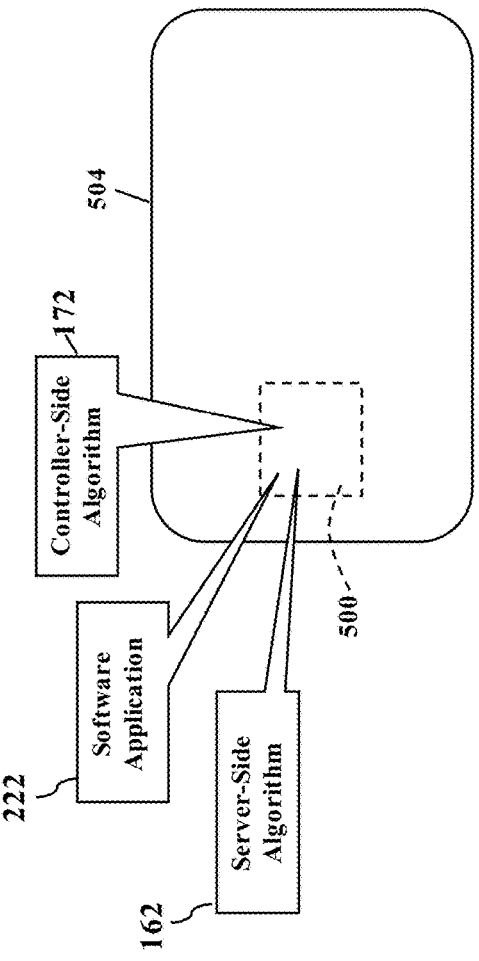

FIGS. 20-23 are schematics further illustrating operating environments for additional aspects of the exemplary embodiments. FIG. 20 is a block diagram of a Subscriber Identity Module 500, while FIGS. 21 and 22 illustrate, respectively, the Subscriber Identity Module 500 embodied in a plug 502 and in a card 504. As those of ordinary skill in the art recognize, the Subscriber Identity Module 500 may be used in conjunction with many communications devices (such as the client device 160 and the mobile smartphone 180). The Subscriber Identity Module 500 stores user information (such as the user's International Mobile Subscriber Identity, the user's K, number, and other user information) and any portion of the server-side algorithm 162, the controller-side algorithm 172, and/or the software application 222. As those of ordinary skill in the art also recognize, the plug 502 and the card 504 each may physically or wirelessly interface with the mobile smartphone 80 (as illustrated in FIGS. 2-3).

FIG. 20 is a block diagram of the Subscriber Identity Module 500, whether embodied as the plug 502 of FIG. 21 or as the card 504 of FIG. 22. Here the Subscriber Identity Module 500 comprises a microprocessor 506 (μP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the server-side algorithm 162, the controller-side algorithm 172, and/or the software application 222 in one or more of the memory modules 508. FIG. 20 shows the server-side algorithm 162, the controller-side algorithm 172, and/or the software application 222 residing in the Erasable-Programmable Read Only Memory 516, yet either module may alternatively or additionally reside in the Read Only Memory 512 and/or the Random Access/Flash Memory 514. An Input/Output module 518 handles communication between the Subscriber Identity Module 500 and the communications device. Because Subscriber Identity Modules are well known in the art, this patent will not further discuss the operation and the physical/memory structure of the Subscriber Identity Module 500.

Figure 23:
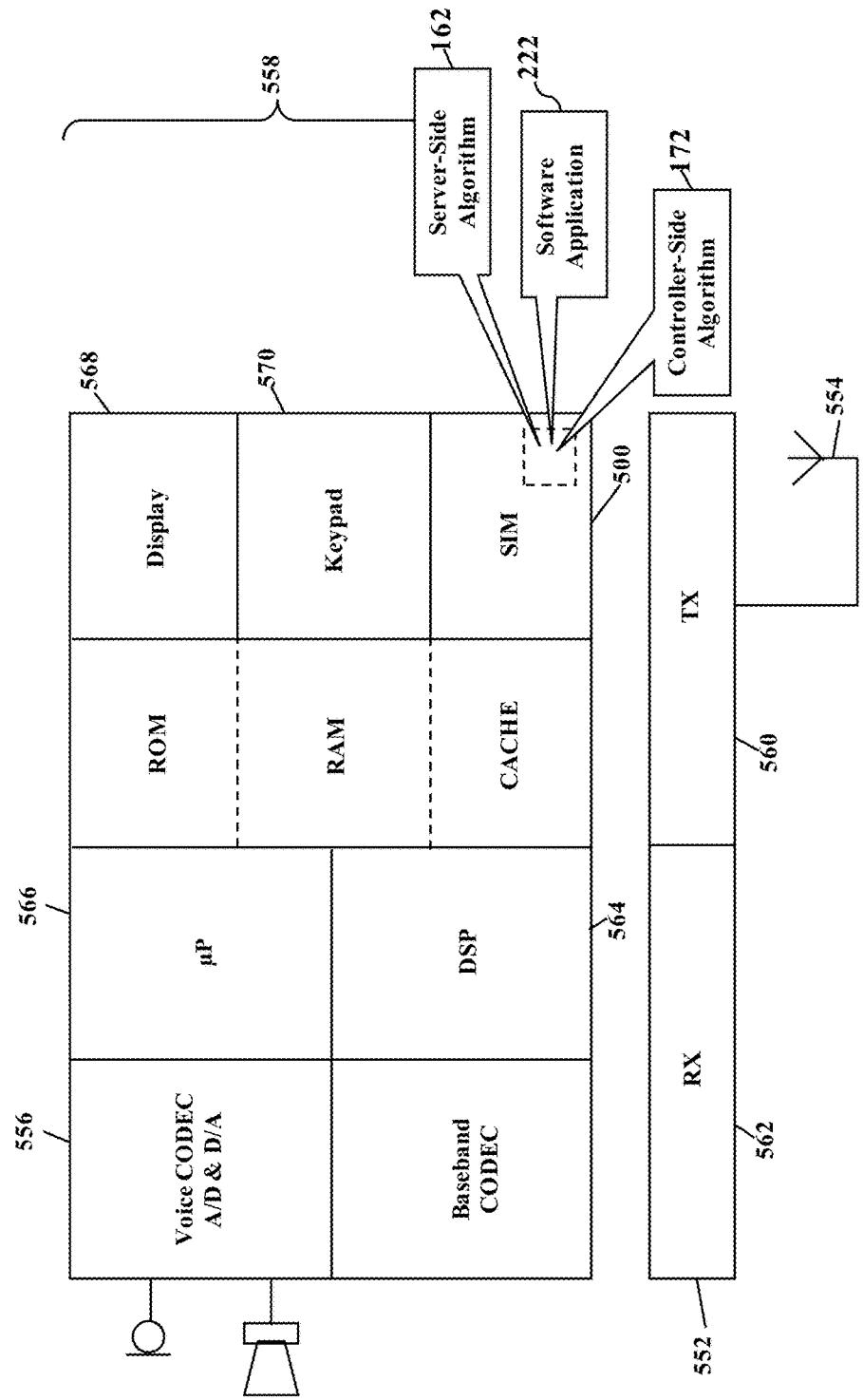

FIG. 23 is a schematic further illustrating the operating environment, according to exemplary embodiments. FIG. 32 is a block diagram illustrating some componentry of the security controller 38 and/or the mobile smartphone 80. The componentry may include one or more radio transceiver units 552, an antenna 554, a digital baseband chipset 556, and a man/machine interface (MIMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chipset 556 contains a digital signal processor (DSP) 564 and performs signal processing functions for audio (voice) signals and RF signals. As FIG. 32 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the controller-side algorithm 172 and/or the software application 116.

Exemplary embodiments may be applied to any signaling standard. As those of ordinary skill in the art recognize, FIGS. 29-32 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for security services, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:

receiving, by a server, an electronic message sent from an early warning system, the electronic message specifying a geographic area and a code associated with a natural disaster;

querying, by the server, an electronic database for the geographic area associated with the natural disaster, the electronic database electronically associating Internet protocol addresses associated with security controllers associated with security systems and geographic areas including the geographic area associated with the natural disaster;

retrieving, by the server, the Internet protocol addresses from the electronic database that are electronically associated with the geographic area associated with the natural disaster;

identifying, by the server, predetermined text that is electronically associated with the code associated with the natural disaster; and sending, by the server, electronic warning messages to the security controllers associated with the Internet protocol addresses retrieved from the electronic database, the electronic warning messages specifying the predetermined text to warn the security controllers of the natural disaster.

2. The method of claim 1, further comprising retrieving the code from the electronic message sent from the early warning system, the code uniquely identifying the natural disaster.

3. The method of claim 1, further comprising querying another electronic database for the code uniquely identifying the natural disaster, the another electronic database electronically associating codes associated with different natural disasters and the predetermined text.

4. The method of claim 3, further comprising retrieving the predetermined text from the another electronic database, the predetermined text electronically associated with the code uniquely identifying the natural disaster.

5. The method of claim 1, further comprising querying another electronic database for the code uniquely identifying the natural disaster, the another electronic database having electronic associations between different codes associated with different natural disasters and notification addresses.

6. The method of claim 5, further comprising retrieving a notification address of the notification addresses from the another electronic database, the notification address electronically associated with the code uniquely identifying the natural disaster.

7. The method of claim 6, further comprising sending an electronic notification message to the notification address retrieved from the another electronic database, the electronic notification message warning a recipient of the natural disaster.

8. A system, comprising:
a processor; and
a memory device, the memory device storing instructions, the instructions when executed causing the processor to perform operations, the operations comprising:
receiving an electronic message sent from an early warning system, the electronic message specifying a code associated with a geographic area experiencing a natural disaster;
querying an electronic database for the geographic area experiencing the natural disaster, the electronic database electronically associating Internet protocol addresses associated with security controllers associated with security systems and geographic areas including the geographic area experiencing the natural disaster;
retrieving the Internet protocol addresses from the electronic database that are electronically associated with the geographic area experiencing the natural disaster;
identifying predetermined text that is electronically associated with the code associated with the geographic area experiencing the natural disaster; and
sending electronic warning messages to the security controllers associated with the Internet protocol addresses retrieved from the electronic database, the electronic warning messages specifying the predetermined text to warn the security controllers of the natural disaster.

9. The system of claim 8, wherein the operations further comprise retrieving the code from the electronic message sent from the early warning system, the code uniquely identifying the natural disaster.

10. The system of claim 8, wherein the operations further comprise querying another electronic database for the code specified by the electronic message sent from the early warning system, the another electronic database having electronic associations between different codes associated with different natural disasters and the predetermined text.

11. The system of claim 10, wherein the operations further comprise retrieving the predetermined text from the another electronic database, the predetermined text electronically associated with the code specified by the electronic message sent from the early warning system.

12. The system of claim 9, wherein the operations further comprise querying another electronic database for the code specified by the electronic message sent from the early warning system, the another electronic database having electronic associations between different codes associated with different natural disasters and notification addresses.

13. The system of claim 12, wherein the operations further comprise retrieving a notification address of the notification addresses from the another electronic database, the notification address electronically associated with the code specified by the electronic message sent from the early warning system.

14. The system of claim 13, wherein the operations further comprise sending an electronic notification message to the notification address retrieved from the another electronic database, the electronic notification message warning a recipient of the natural disaster.

15. A memory device storing instructions that when executed cause a processor to perform operations, the operations comprising:
receiving an electronic message sent from an early warning system, the electronic message specifying a geographic area experiencing a natural disaster;
retrieving a code from the electronic message sent from the early warning system, the code uniquely identifying the natural disaster;
querying an electronic database for the geographic area experiencing the natural disaster, the electronic database electronically associating Internet protocol addresses associated with security controllers associated with security systems and geographic areas including the geographic area experiencing the natural disaster;
retrieving the Internet protocol addresses from the electronic database that are electronically associated with the geographic area experiencing the natural disaster;
querying another electronic database for the code uniquely identifying the natural disaster, the another electronic database electronically associating codes associated with natural disasters and predetermined text;
sending electronic warning messages to the security controllers associated with the Internet protocol addresses retrieved from the electronic database, the electronic warning messages specifying the predetermined text and warning the security controllers of the natural disaster.

16. The memory device of claim 15, wherein the operations further comprise retrieving the predetermined text that is electronically associated with the code uniquely identifying the natural disaster.

17. The memory device of claim 15, wherein the operations further comprise querying the another electronic database to identify notification addresses that are electronically associated with the code uniquely identifying the natural disaster.

18. The system of claim 17, wherein the operations further comprise retrieving a notification address of the notification addresses from the another electronic database, the notification address electronically associated with the code uniquely identifying the natural disaster.

* * * * *